US010205223B2

(12) United States Patent
Chang et al.

(10) Patent No.: US 10,205,223 B2
(45) Date of Patent: Feb. 12, 2019

(54) COMMUNICATION DEVICE USING INTERNAL COMPONENTS OF DEVICE AS RADIO ANTENNA

(71) Applicant: HON HAI PRECISION INDUSTRY CO., LTD., New Taipei (TW)

(72) Inventors: Hao-Ying Chang, New Taipei (TW); Pai-Cheng Huang, New Taipei (TW); Chih-Yang Tsai, New Taipei (TW); Ching-Sung Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 183 days.

(21) Appl. No.: 15/260,274

(22) Filed: Sep. 8, 2016

(65) Prior Publication Data

US 2017/0194696 A1 Jul. 6, 2017

(30) Foreign Application Priority Data

Dec. 31, 2015 (TW) .............................. 104144804 A

(51) Int. Cl.
*H01Q 1/24* (2006.01)
*H01Q 1/38* (2006.01)
*H01Q 1/50* (2006.01)
*H04M 1/02* (2006.01)
*H01Q 1/44* (2006.01)

(52) U.S. Cl.
CPC ............... *H01Q 1/243* (2013.01); *H01Q 1/38* (2013.01); *H01Q 1/44* (2013.01); *H01Q 1/50* (2013.01); *H04M 1/0264* (2013.01)

(58) Field of Classification Search
CPC ............. H01Q 1/50; H01Q 1/243; H01Q 1/38
USPC ......................................................... 343/702
See application file for complete search history.

(56) References Cited

U.S. PATENT DOCUMENTS

| 9,196,963 | B2 * | 11/2015 | Rhyu | ...................... | H01Q 7/00 |
| 2005/0219144 | A1 | 10/2005 | Ying | | |
| 2012/0327621 | A1 * | 12/2012 | Rhyu | ..................... | H01Q 1/243 361/760 |
| 2014/0168015 | A1 * | 6/2014 | Kim | ...................... | H01Q 1/243 343/702 |
| 2015/0117502 | A1 * | 4/2015 | Chen | ....................... | H01Q 5/22 375/219 |
| 2016/0079671 | A1 * | 3/2016 | Yamaguchi | ............ | H01Q 1/243 343/702 |

* cited by examiner

Primary Examiner — Huedung Mancuso
(74) Attorney, Agent, or Firm — ScienBiziP, P.C.

(57) ABSTRACT

A device communicating wirelessly using internal function components as antenna includes a case, and within the case a circuit board, a camera mechanism, and a wireless communication mechanism. The case includes an upper shell and a lower shell, the lower shell defining a slot is filled with an insulation strip. The camera mechanism and the wireless communication mechanism are arranged on the circuit board. The wireless communication mechanism faces the slot. The wireless communication mechanism and the camera mechanism cooperatively form an antenna. A wireless signal generated by the wireless communication mechanism is enhanced by the antenna and radiates outward from the slot.

12 Claims, 7 Drawing Sheets

COMMUNICATION DEVICE USING INTERNAL COMPONENTS OF DEVICE AS RADIO ANTENNA

CROSS-REFERENCE TO RELATED APPLICATIONS

This application claims priority to Taiwanese Patent Application No. 104144804 filed on Dec. 31, 2015, the contents of which are incorporated by reference herein.

FIELD

The subject matter herein generally relates to a communication device.

BACKGROUND

A communication device may capture images and communicate with another communication device. The communication device may include an antenna, a wireless communication mechanism, and two lenses. The two lenses are configured for recording images in stereoscopic effect. When arranging the antenna and the two lenses adjacent to each other, a radiation efficiency of the antenna is affected by metal supports of the two lenses. When separating the two lenses and arranging the antenna, space in the communication device is reduced.

BRIEF DESCRIPTION OF THE DRAWINGS

Implementations of the present technology will now be described, by way of example only, with reference to the attached figures.

DETAILED DESCRIPTION

Figure 1:
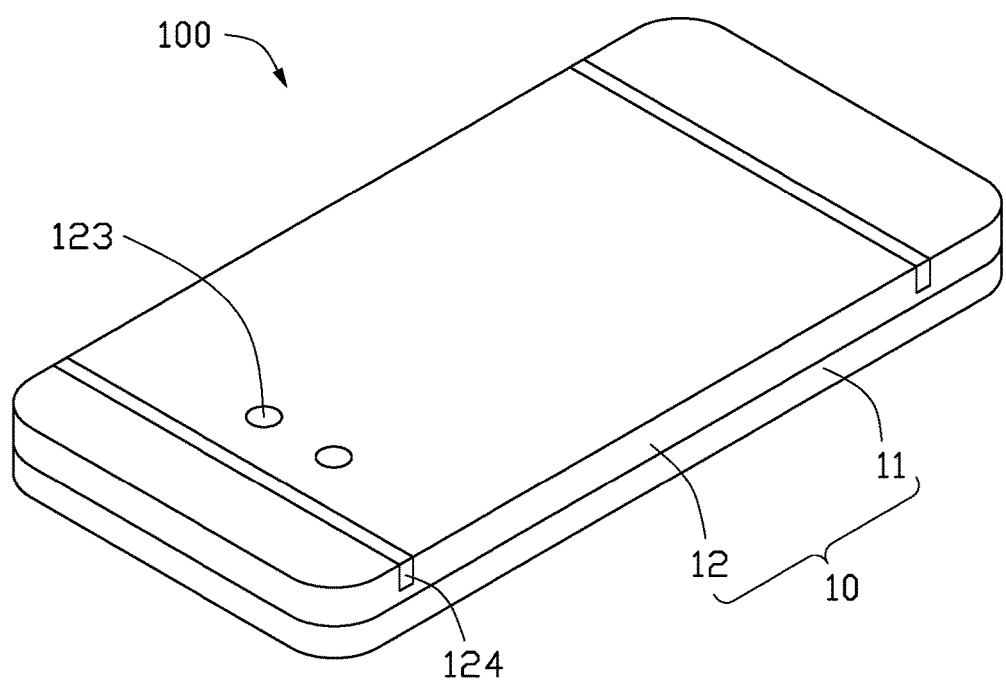
FIG. 1 is an isometric view of an embodiment of a communication device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain sections have been exaggerated to better illustrate details and features of the present disclosure.

Several definitions that apply throughout this disclosure will now be presented.

The term "substantially" is defined to be essentially conforming to the dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a communication device. The communication device comprises a case, a circuit board, a camera mechanism, and a wireless communication mechanism. The case comprises an upper shell and a lower shell. The lower shell defines a slot. The slot is filled with an insulation strip. The circuit board received in the case. The camera mechanism is received in the case and is arranged on the circuit board. The wireless communication mechanism is received in the case and is arranged on the circuit adjacent to the slot. The wireless communication mechanism and the camera mechanism cooperatively form an antenna. The antenna enhances a wireless signal generated by the wireless communication mechanism and the wireless signal radiates from the slot to the outside.

Figure 2:
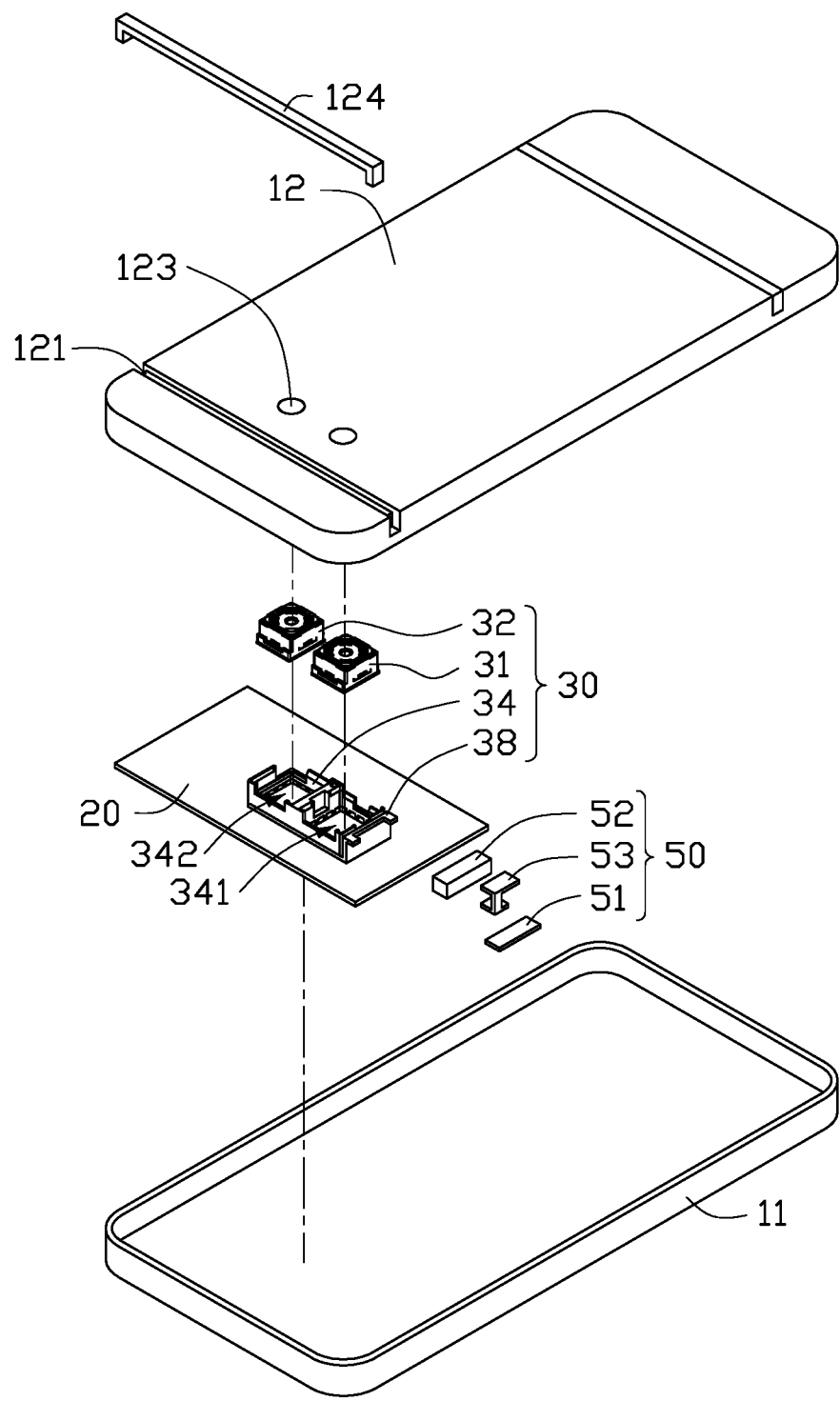
FIG. 2 is an exploded view of the embodiment of the communication device of FIG. 1.

FIGS. 1 and 2 illustrate a communication device 100 of a first embodiment. The communication device 100 includes a case 10, a printed circuit board 20, a camera mechanism 30, and a wireless communication mechanism 50. The printed board 20, the camera mechanism 30, and the wireless communication mechanism 50 are received in the case 10. The camera mechanism 30 and the wireless communication mechanism 50 are arranged on and electrically connected to the printed circuit board 20. The camera mechanism 30 is partly exposed from the case 10. The communication device 100 can be a portable electronic such as a mobile phone, or a tablet. In one embodiment, the communication device 100 is a mobile phone.

The case 10 is substantially a rectangular shape. The case 10 includes an upper shell 11 and a lower shell 12. The upper shell 11 clamps and mounts to the lower shell 12. The upper shell 11 and the lower shell 12 cooperatively form a closed space. The printed circuit board 20, the camera mechanism 30, and the wireless communication mechanism 50 are received in the closed space. The lower shell 12 defines a slot 121 and at least one opening 123. The slot 121 extends along a first direction. In one embodiment, the first direction is parallel to a width direction of the case 10. The lower shell 12 further includes an insulation strip 124. The insulation strip 124 fills in the slot 121. In one embodiment, there are two of the at least one opening 123. The communication device 100 further includes essential elements for operation of the communication device, such as a processor, a memory, a battery, and the like. In one embodiment, the case 10 forms a body of the communication device 100. The upper shell 11 can be a transparent cover plate. The lower shell 12 can be a back plate of the communication device 100. The upper shell 11 and the lower shell 12 can be mounted together by screws.

The printed circuit board 20 is substantially a plate. The printed circuit board 20 provides electrical signals to the camera mechanism 30 and the wireless communication mechanism 50.

Figure 3:
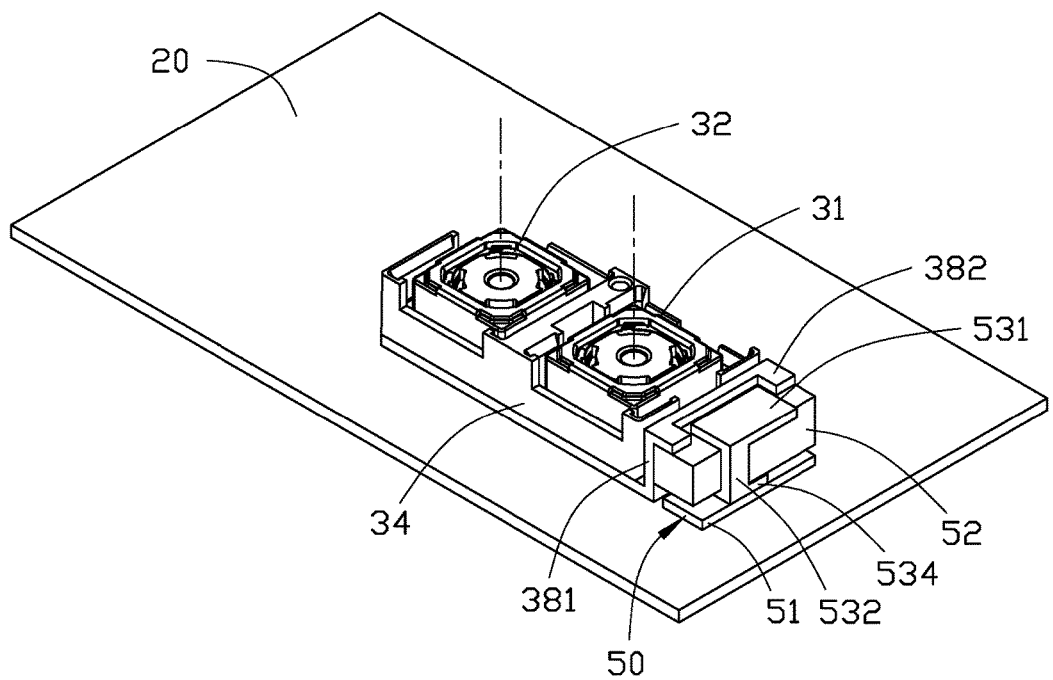
FIG. 3 is an enlarged view of a portion of the communication device shown in FIG. 2.

FIG. 3 illustrates that the camera mechanism 30 is arranged on the printed circuit board 20 and is electrically connected with the printed circuit board 20. In one embodiment, the camera mechanism 30 includes two cameras. The camera mechanism 30 includes a first camera 31, a second camera 32, a first frame 34, and a coupling portion 38. In one embodiment, each of the first camera 31 and the second camera 32 corresponds to an opening 123. Each of the first camera 31 and the second camera 32 is exposed from an opening 123.

In one embodiment, an optical axis of the first camera 31 and an optical axis of the second camera 32 are parallel to each other. Both of the first camera 31 and the second camera 32 can switch between a photographic mode and a video mode. When the first camera 31 and the second camera 32 are in the photographic mode, the first camera 31 and the second camera 32 are configured to capture images, singular or multiple images. When the first camera 31 and the second camera 32 are in the video mode, the first camera 31 and the second camera 32 are configured to record moving pictures, videos, and the like. In one embodiment, the first camera 31 and the second camera 32 can be in photographic mode at the same time to capture stereoscopic images. In another embodiment, the first camera 31 and the second camera 32 can each be in a different mode. That is, the first camera 31 can be in a photographic mode and the second camera 32 can be in a video mode, or the first camera 31 in a video mode and the second camera in photographic mode, therefore capturing images and moving pictures at a same time. In one embodiment, the first camera 31 and the second camera 32 can have different focal lengths. In other embodiments, the first camera 31 and the second camera 32 can have a same focal length adjustment range. In one embodiment, at least one of the first camera 31 and the second camera 32 can rotate to adjust an angle between the optical axis of the first camera 31 and the printed circuit board 20, an angle between the optical axis of the second camera 32 and the printed circuit board 20, or a combination thereof from about 60 degrees to about 120 degrees.

The first frame 34 is electrically connected to a ground connection of the printed circuit board 20. The first frame 34 can be a discharge path to reduce static electricity. The first frame 34 defines a first cavity 341 and a second cavity 342. The first cavity 341 is configured to receive the first camera 31. The second cavity is configured to receive the second camera 32. In one embodiment, the first frame 34 is made of metal. In one embodiment, at least one clamping bump (not shown) is defined on an inner surface of the first frame 34. In other embodiment, the inner surface of the first frame 34 is substantially step-like, to support the first camera 31 and the second camera 32 in line.

The coupling portion 38 is located at a side of the first frame 34 and extends perpendicularly from a side of the first frame 34. The coupling portion 38 includes a first coupling portion 381 and a second coupling portion 382. The first coupling portion 381 is substantially perpendicular to the second coupling portion 382 and the printed circuit board 20. The first coupling portion 381 is located between the first frame 34 and the wireless communication mechanism 50.

The second coupling portion 382 is substantially parallel to the printed circuit board 20 and is located on a surface of the wireless communication mechanism 50 opposite the circuit board 20. The second coupling portion 382 is substantially a U shape.

The wireless communication mechanism 50 is located on the printed circuit board 20 and faces the slot 121. The wireless communication mechanism 50 is configured to communicate wirelessly with another communication device or other. The wireless communication mechanism 50 and the camera mechanism 30 cooperatively form an antenna to enhance a wireless signal of the communication device 100. The wireless signal radiates from the slot 121 to the outside. In one embodiment, the wireless mechanism 50 can be a wireless fidelity (WIFI) transceiver under the Institute of Electrical and Electronics Engineers (IEEE) 802.11 b/g/n communication protocols or IEEE 802.11 a/c communication protocols.

The wireless mechanism 50 includes a wireless communication element 51, a support 52, and a metal bracket 53. The wireless communication element 51 is arranged on the printed circuit board 20, and is electrically connected to the metal bracket 53. The wireless communication element 51 is configured to generate a wireless signal. The support 52 is substantially rectangular shaped. The metal bracket 53, the first frame 34, and the clamping portion 38 cooperatively form an antenna to enhance the wireless signal generated by the wireless communication element 51. The enhanced wireless signal radiates from the slot 121 to the outside of the case 10. The metal bracket 53 includes a first metal sheet 531, a second metal sheet 532, and a third metal sheet 534. The first metal sheet 531 is located on a surface of the support 52 away from the wireless communication element 51 and adjacent to the second coupling portion 382. The first metal sheet 531 is electrically insulated from the second coupling portion 382. The second metal sheet 532 is located at a surface of the support 52 away from the first frame 34 and is electrically connected to the first metal sheet 531. The third metal sheet 534 is located between the support 52 and the wireless communication element 51 and electrically connects the second metal sheet 532 to the wireless communication element 51. In one embodiment, the support 52 is made of plastic material.

Figure 4:
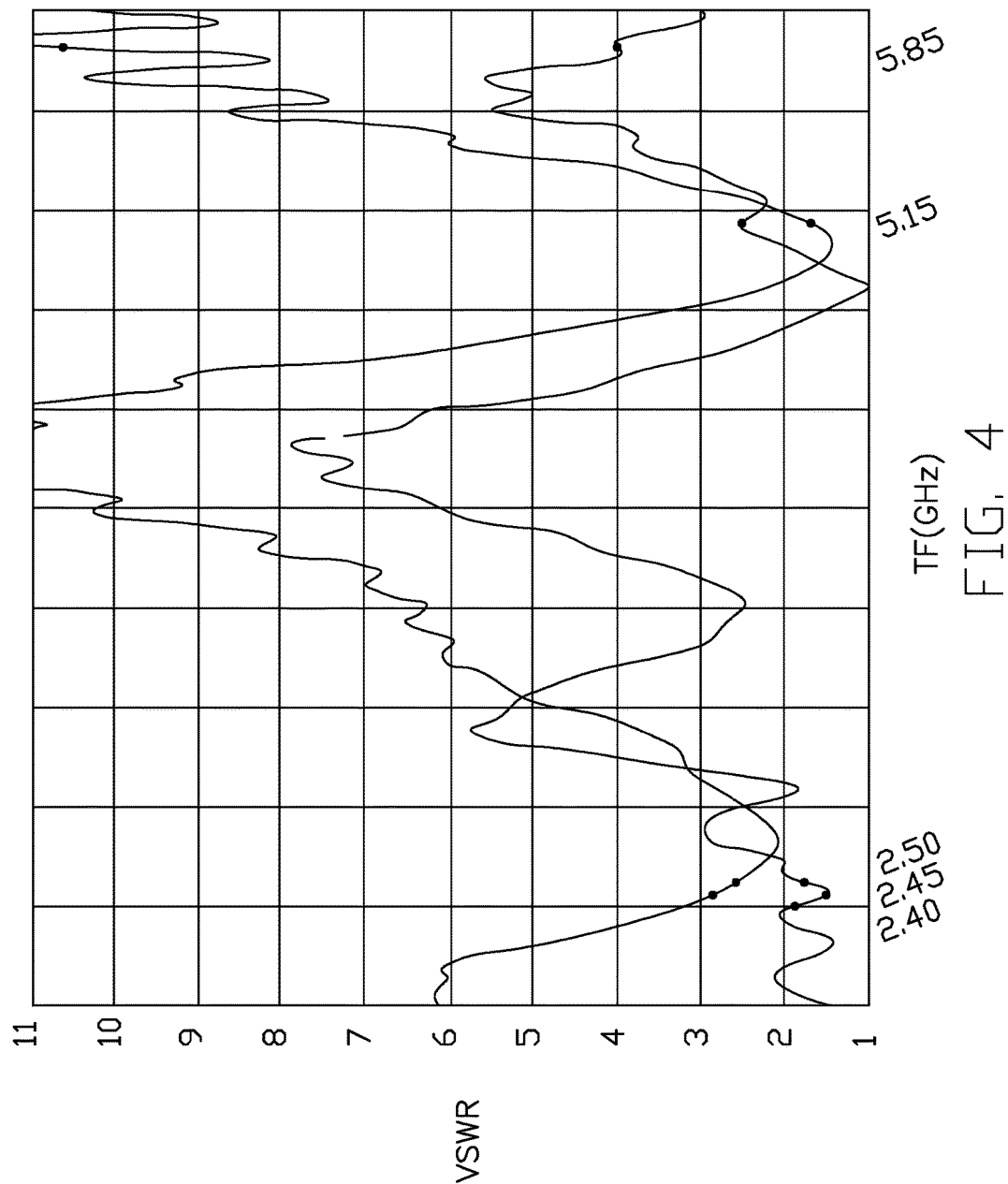
FIG. 4 is a diagram of a waveform of voltage standing wave ratio of the communication device of FIG. 2.

FIG. 4 illustrates waveforms of transmission frequency (TF) and voltage standing wave ratio (VSWR) of the wireless communication mechanism 50 of the communication device 100. When the TF is 2.4 GHz, the VSWR is 3.3437; when the TF is 2.45 GHz, the VSWR is 3.0219; when the TF is 2.5 GHz, the VSWR is 2.661; when the TF is 5.15 GHz, the VSWR is 1.6876; when the TF is 5.85 GHz, the VSWR is 10.102. Table 1-1 illustrates a percentage relation between transmission frequency and efficiency of the wireless communication mechanism 50 when cooperating with the camera mechanism 30 of the present disclosure. Table 1-1 also illustrates a wireless communication mechanism in prior art under different communication protocols.

TABLE 1-1 percentage relation between transmission frequency and efficiency;

| | communication protocols | | | | | | | |
|---|---|---|---|---|---|---|---|---|
| | IEEE 802.11 b/g/n | | | | IEEE 802.11 a/c | | | |
| transmission frequency (MHz) | 2420 | 2440 | 2460 | 2480 | 5150 | 5250 | 5470 | 5650 | 5850 |

TABLE 1-1-continued percentage relation between transmission frequency and efficiency;

| | | communication protocols | | | | | | | |
|---|---|---|---|---|---|---|---|---|---|
| | | IEEE 802.11 b/g/n | | | | IEEE 802.11 a/c | | | |
| Efficiency % | Prior art | 37.15 | 39.81 | 41.69 | 41.69 | 16.22 | 22.39 | 27.54 | 18.20 | 15.49 |
| | Present disclosure | 38.90 | 42.66 | 57.71 | 46.77 | 33.88 | 38.02 | 28.18 | 30.90 | 34.67 |

Table 1-1 illustrates efficiency of the wireless communication mechanism 50 cooperating with the camera mechanism 30 to form an antenna to enhance wireless signals generated by the wireless communication element 51 in two protocols. The camera mechanism 30 and the wireless communication mechanism 50 are arranged on the same circuit board 20 to improve an integration of the communication device 100.

Figure 5:
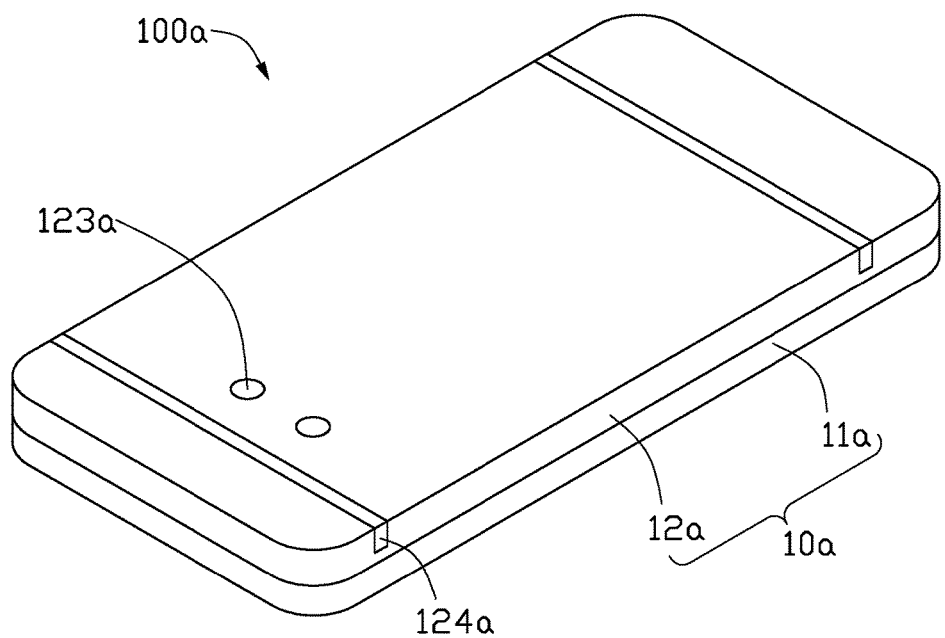
FIG. 5 is an isometric view of a second embodiment of the communication device.
Figure 6:
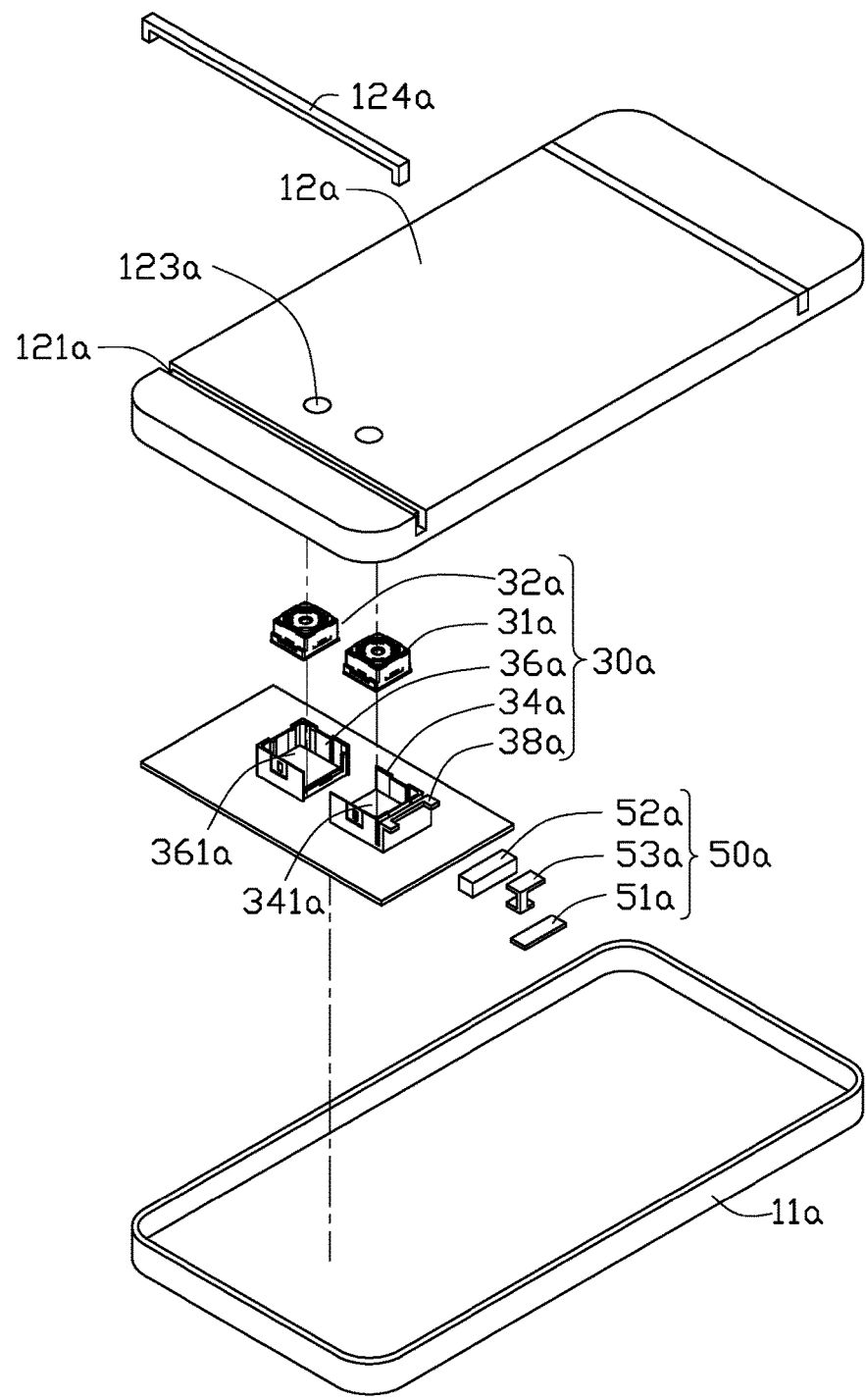
FIG. 6 is an exploded view of the embodiment of the communication device of FIG. 5.

FIGS. 5 and 6 illustrate a communication device 100a of a second embodiment. The communication device 100a includes a case 10a, a circuit board 20a, a camera mechanism 30a, and a wireless communication mechanism 50a. The printed board 20a, the camera mechanism 30a, and the wireless communication mechanism 50a are received in the case 10a. The camera mechanism 30a and the wireless communication mechanism 50a are arranged on and electrically connected to the printed circuit board 20a. The camera mechanism 30a is partly exposed from the case 10. The communication device 100a can be a portable electronic such as a mobile phone, or a tablet. In one embodiment, the communication device 100a is a mobile phone.

The case 10a is substantially rectangular shaped. The case 10a includes an upper shell 11a and a lower shell 12a. The upper shell 11a clamps and mounts to the lower shell 12a. The upper shell 11a and the lower shell 12a cooperatively form a closed space. The printed circuit board 20a, the camera mechanism 30a, and the wireless communication mechanism 50a are received in the closed space. The lower shell 12a defines a slot 121a and at least one opening 123a. The slot 121a extends along a first direction. In one embodiment, the first direction is parallel to a width direction of the case 10a. The lower shell 12a further includes an insulation strip 124a. The insulation strip 124a fills in the slot 121a. In one embodiment, there are at least two openings 123a. The communication device 100a further includes essential elements for operation of the communication device, such as a processor, a memory, a battery, and the like. In one embodiment, the case 10a forms a body of the communication device 100a. The upper shell 11a can be a transparent cover plate. The lower shell 12a can be a back plate of the communication device 100a. The upper shell 11a and the lower shell 12a can be mounted together by screws.

The printed circuit board 20a is substantially a plate. The printed circuit board 20a provides electrical signals to the camera mechanism 30a and the wireless communication mechanism 50a.

Figure 7:
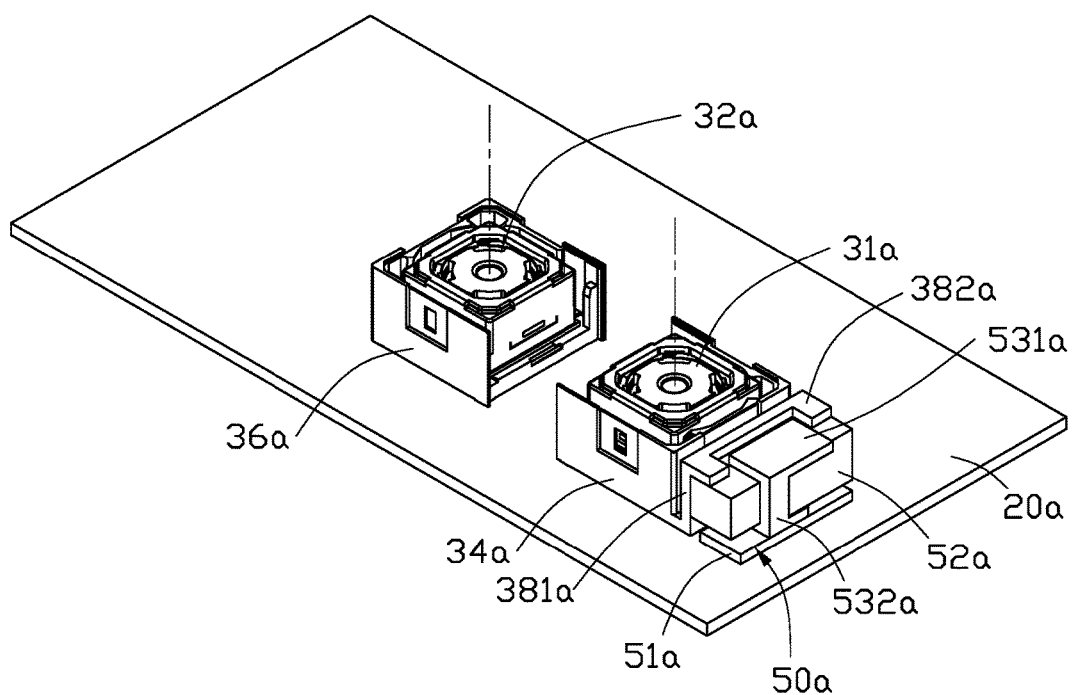
FIG. 7 is an enlarged view of a portion of the communication device shown in FIG. 5.

FIG. 7 illustrates that the camera mechanism 30a is arranged on the printed circuit board 20 and is electrically connected with the printed circuit board 20a. In one embodiment, the camera mechanism 30a includes two cameras. The camera mechanism 30a includes a first camera 31a, a second camera 32a, a first frame 34a, a second frame 36a, and a coupling portion 38a. In one embodiment, each of the first camera 31a and the second camera 32a corresponds to an opening 123a. Each of the first camera 31a and the second camera 32a is exposed from an opening 123a.

In one embodiment, an optical axis of the first camera 31a and an optical axis of the second camera 32a are substantially parallel to each other. Both of the first camera 31a and the second camera 32 can switch between photographic and video modes. When both first and second camera 31a and 32a are in photographic mode, both cameras capture images. When both first and second camera 31a and 32a are in video mode, both lenses capture moving pictures. In one embodiment, the first camera 31a and the second camera 32a can be in photographic mode at a same time to capture stereoscopic images. In another embodiment, the first camera 31a and the second camera 32a can be in different modes. That is, the first camera 31a in photographic mode and the second camera 32a in video mode, or the first camera 31a in video mode and the second camera 32a in photographic mode, therefore taking moving pictures and photographs at a same time. In one embodiment, the first camera 31a and the second camera 32a can have different focal lengths. In other embodiment, the first camera 31a and the second camera 32a can have a same focal length adjustment range. In one embodiment, at least one of the first camera 31a and the second camera 32a can rotate to adjust an angle between the optical axis of the first camera 31a and the printed circuit board 20a, an angle between the optical axis of the second camera 32a and the printed circuit board 20a, or a combination thereof from about 60 degrees to about 120 degrees.

The first frame 34a and the second frame 36a are electrically connected to a ground connection of the printed circuit board 20a, and the first frame 34a is spaced apart from the second frame 36a. The first frame 34a, the second frame 36a, and the ground connection of the printed circuit board 20a cooperatively form a discharge path to reduce static electricity. The first frame 34a defines a first cavity 341a. The second frame 36a defines a second cavity 361a. The first cavity 341a is configured to receive the first camera 31a. The second cavity is configured to receive the second camera 32a. In one embodiment, the first frame 34a and the second frame 36a are made of metal. In one embodiment, at least one clamping bump (not shown) is defined on inner surfaces of the first frame 34a and the second frame 36a. In other embodiment, the inner surfaces of the first frame 34a and the second frame 36a are substantially step-like to support the first camera 31a and the second camera 32a in line.

The coupling portion 38a is located at a side of first frame 34, and extends perpendicularly from a side of the first frame 34a. The coupling portion 38a includes a first coupling portion 381a and a second coupling portion 382a. The first coupling portion 381a is substantially perpendicular to the second coupling portion 382a and the printed circuit board 20a. The first coupling portion 381a is located between the first frame 34a and the wireless communication mechanism 50a. The second coupling portion 382a is substantially parallel to the printed circuit board 20a and is located on the wireless communication mechanism 50a. The second coupling portion 382a is substantially a U shape.

The wireless communication mechanism 50a is located on the printed circuit board 20a, and faces the slot 121a. The wireless communication mechanism 50a is configured to wirelessly communicate with other devices. The wireless communication mechanism 50a and the camera mechanism 30a cooperatively form an antenna to enhance a wireless signal of the communication device 100a. The wireless signal radiates from the slot 121a to the outside. In one embodiment, the wireless mechanism 50a can be a wireless fidelity (WIFI) transceiver under Institute of Electrical and Electronics Engineers (IEEE) 802.11 b/g/n communication protocols or IEEE 802.11 a/c communication protocols.

The wireless mechanism 50a includes a wireless communication element 51a, a support 52a, and a metal bracket 53a. The wireless communication element 51a is arranged on the printed circuit board 20a and is electrically connected to the metal bracket 53a. The wireless communication element 51a is configured to generate a wireless signal. The support 52a is substantially rectangular shaped. The metal bracket 53a, the first frame 34a, and the clamping portion cooperatively form an antenna to enhance the wireless signal generated by the wireless communication element 51a. The enhanced wireless signal radiates from the slot 121a to the outside of the case 10a. The metal bracket 53a includes a first metal sheet 531a, a second metal sheet 532a, and a third metal sheet 534a. The first metal sheet 531a is located on a surface of the support 52a away from the wireless communication element 51a, and is adjacent to the second coupling portion 382a. The first metal sheet 531a is electrically insulated from the second coupling portion 382a. The second metal sheet 532a is located at a surface of the support 52a away from the first frame 34a and is electrically connected to the first metal sheet 531a. The third metal sheet 534a is located between and electrically connects between the support 52a and the wireless communication element 51a. In one embodiment, the support 52a is made of plastic material.

The embodiments shown and described above are only examples. Many details are often found in the art such as the other features of a wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the sections within the principles of the present disclosure, up to and including the full extent established by the broad general meaning of the terms used in the claims. It will therefore be appreciated that the embodiments described above may be modified within the scope of the claims.

What is claimed is:

1. A communication device comprising:
    a case, comprising an upper shell and a lower shell, the lower shell defining a slot, the slot filled with an insulation strip;
    a circuit board received in the case;
    a camera mechanism received in the case and arranged on the circuit board;
    a wireless communication mechanism received in the case and arranged on the circuit adjacent to the slot; and
    wherein the wireless communication mechanism and the camera mechanism cooperatively form an antenna, the antenna enhances a wireless signal generated by the wireless communication mechanism and the wireless signal radiates from the slot to the outside, the camera mechanism comprises a first frame and a coupling portion, and the coupling portion extends perpendicularly from a side of the first frame.

2. The communication device of claim 1, wherein the coupling portion comprises a first coupling portion and a second coupling portion, the first coupling portion is perpendicular to the printed circuit board and is located between the first frame and the wireless communication mechanism; wherein the second coupling portion is parallel to the circuit board and is located on a surface of the wireless communication mechanism away from the circuit board.

3. The communication device of claim 2, wherein the wireless communication mechanism comprises a wireless communication element, a support, and a metal bracket, the wireless communication element is arranged on and electrically connected with the metal bracket, the metal bracket is arranged on a surface of the support; and wherein the metal bracket, the first frame, and the coupling portion cooperatively form the antenna.

4. The communication device of claim 3, wherein the metal bracket comprises a first metal sheet, a second metal sheet, and a third metal sheet, the first metal sheet is located on a surface of the support away from the wireless communication element and adjacent to the second coupling portion, the first metal sheet is electrically insulated from the second coupling portion, the second metal sheet is located at a surface of the support away from the first frame and is electrically connected to the first metal sheet, the third metal sheet is located between the support and the wireless communication element and electrically connects the second metal sheet to the wireless communication element.

5. The communication device of claim 2, wherein the camera mechanism further comprises a first camera and a second camera, the first frame defines a first cavity and a second cavity, the first camera is received in the first cavity, the second camera is received in the second cavity, and an optical axis of the first camera and an optical axis of the second camera are parallel to each other.

6. The communication device of claim 5, wherein both of the first camera and the second camera are capable of switching between a photographic mode and a video mode.

7. The communication device of claim 5, wherein the first camera and the second camera have different focal length adjustment ranges.

8. The communication device of claim 5, wherein at least one of the first camera and the second camera is capable of rotating and adjusting an angle between the optical axis of the first camera and the printed circuit board, the angle between an optical axis of the second camera and the printed circuit board, or a combination thereof from about 60 degrees to about 120 degrees.

9. The communication device of claim 2, wherein the camera mechanism further comprises a first camera, a second camera, and a second frame, the second frame is arranged on the circuit board and is spaced apart from the first frame, the first camera is received in the first frame, the second camera is received in the second frame, and an optical axis of the first camera and an optical axis of the second camera are parallel to each other.

10. The communication device of claim 9, wherein the first camera and the second camera are capable of switching between a photographic mode and a video mode.

11. The communication device of claim 9, wherein the first camera and the second camera have different focal length adjustment ranges.

12. The communication device of claim 9, wherein at least one of the first camera and the second camera is capable of rotating and adjusting an angle between the optical axis of the first camera and the printed circuit board, an angle between the optical axis of the second camera and the printed circuit board, or a combination thereof from about 60 degrees to about 120 degrees.

* * * * *